Sept. 1, 1964     A. M. THOMSEN     3,147,072
METHOD OF PROCESSING SEA WATER
Filed Jan. 4, 1961
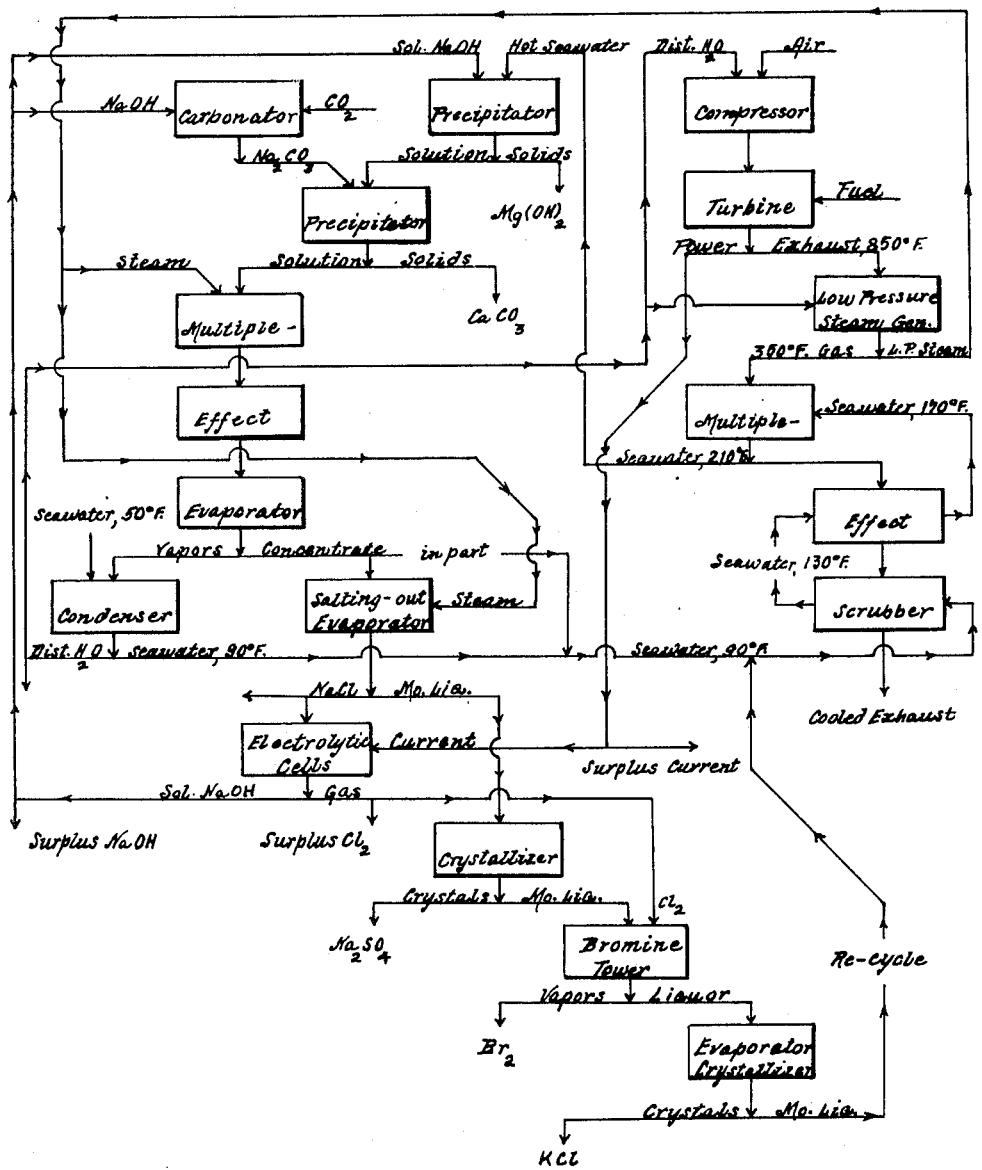
INVENTOR.
Alfred M. Thomsen

3,147,072
METHOD OF PROCESSING SEA WATER
Alfred M. Thomsen, 265 Buckingham Way, Apt. 402, San Francisco, Calif.
Filed Jan. 4, 1961, Ser. No. 80,630
7 Claims. (Cl. 23—42)

Apart from hydro-electric sources the main power source of modern plants is the high-pressure steam plants that are able to convert rather more than 30% of the heat value in the fuel into electrical energy. Inasmuch as the gas-turbine, so-called, is definitely inferior in this respect it is not often considered as a prime-mover and many schemes have been advanced to convert some small part of its wasted heat into power. With this type of utilization I am not concerned. Contrariwise, I aim to integrate said wasted heat with a chemical proposal involving the use of sea water in a manner so perfect that power becomes actually a by-product of the entire sequence of operations. It is, therefore, not merely the use of such heat, normally wasted, in which my process resides but rather in the particular manner in which this is achieved and, particularly, with sea water as the vehicle for such heat conservation.

Naturally, deviations from some specific set of steps can be achieved by the addition or omission of one or more of such steps and, hence, in a preferred version such as I have illustrated in the drawing I have included as many as possible. However, when I come to the specific description of said drawing, which I call such a preferred version, then I shall call attention to such matters as they arise. It is obvious that before sea water can be subjected to such evaporation as herein described it is essential that it be treated in such a manner that corrosive and scale-forming ingredients be substantially removed. Such treatment of sea water must also be introduced at or near the boiling point so it must become an item in heat utilization of the exhaust gases from the gas turbine.

In describing said drawing I commence with the gas turbine at the upper right hand corner. This device is illustrated in its conventional parts as separate entities, the compressor receiving air and delivering same to the turbine, proper, fuel being meanwhile injected. Such items are, of course, entirely conventional. The turbine delivers exhaust gas at approximately 850° F., and power as an electric current. As the object of my invention is the useful application of the exhaust heat any type of regeneration becomes undesirable and, at best, it is but small and adds much to the capital outlay if regarded solely as a power source. Entering the "compressor" I have also indicated the addition of some distilled water from the condenser, illustrated on the left hand side and at about the middle of the drawing. It is a well known fact that the introduction of some atomized water into said compressor renders the compression more nearly isothermal and thus decreases the power demand from the turbine. Unfortunately, any natural water thus used will ultimately scale the turbine blades so only distilled water is acceptable. Such a proviso virtually nullifies the economics of water injection and it is seldom if ever used. In the instant case where any amount of water in distilled form can be drawn from the condenser the use of water is evidently a desirable addition. The conversion factor of heat into energy of the turbine is thus increased to some extent. If without such use of water the conversion factor of the turbine be 21% it may safely be expected that with water the conversion factor will rise to 23% or even slightly more.

The hot exhaust gas then passes through a "steam generator" where the tempearture is dropped to approximately 350° F., thus producing steam at a pressure of approximately 35 lbs. gage, a very suitable medium for heating a multiple effect evaporator such as I have illustrated on the left hand side, just above the "condenser." The gases from the "steam generator" then enter a multiple-effect scrubber where the remaining heat is stripped and converted into heat absorbed in the sea water undergoing treatment as previously mentioned. Inasmuch as the sea water entering said multiple effect scrubber has already been heated to some 90° F., by serving as cooling water in said condenser, it follows that approximately this is also the final temperature of the cooled exhaust gas.

Any type of "scrubber" will serve. A simple coke filled tower is an excellent "effect" and any number may be so placed that the sea water and hot gas are contracted in counter-current flow. Or a simple "douche" tower with distributed water may be substituted, or any type of commingling device with centrifugal separation between gas and liquid. The sole object, of course, is to strip the gas of its contained heat by transferring said heat to the scrubbing liquid, in this case, sea water in the process of being heated. Parenthetically it may be mentioned that the "condenser" will also be improved if it be installed in two or more sections as in this manner less sea water will be needed for condensation and a higher heat obtained in the final water. Such items are, of course, optional with the operator. The complete heat cycle will now be clear. Cold sea water enters the condenser and leaves at about 90° F. It then passes through the scrubber where by direct contact with partially cooled exhaust gas it is raised to about the boiling point and then enters the precipitator at the top center of the drawing. Here it is commingled with enough sodium hydroxide to precipitate all resident magnesium, settled and filtered, all such conventional steps being inferred as a part of the device called a "precipitator." At the relatively high temperature involved all such steps are rapid and relatively complete. It is obvious that the solids from this reaction is the magnesium hydroxide indicated on the drawing.

The filtered liquid then enters the second precipitator where it is commingled with enough sodium carbonate to precipitate all calcium as the carbonate which is then settled and filtered as in the case previously described under magnesium. I have shown both the sodium hydroxide and the sodium carbonate manufactured from salt ultimately obtained from sea water by conventional electrolysis and carbonatation but this will involve very little power which in the main is "surplus."

After both magnesium and calcium removal the sea water is next evaporated in multiple effect by means of the steam generated from a part of the exhaust heat of the turbine. While only three effects are represented in the drawing the true plant can use eight, still maintaining a temperature differential of approximately 20° F. between effects. This is ample if forced circulation be used in each effect and if every effort is used to conserve heat by adequate insulation. In such a series the "compounding effect" will be very high.

Concentration by evaporation is thus effected in multiple effect until the liquid being evaporated shall be substantially saturated as to sodium chloride content. This "concentrate" is then further evaporated in a saltingout type of evaporator and the major part of such salt separated in conventional manner from the boiling liquid until said liquid shall have become substantially saturated as to sodium sulphate. However, I wish to call attention here to another step shown in the drawing, namely, that a part of said concentrate is re-cycled to the low-temperature effect of the multiple-effect scrubber. As issuing from the multiple-effect evaporator the temperature of said concentrate is but little above 100° F. so it may be commingled to any extent with the untreated sea water, previously heated to about 90° F. by its passage through the condenser as cooling water. In this manner a perfect heat balance can be set up so that all heat resident in said exhaust may be converted into evaporative effect with the exception of that unavoidably lost in the cooled exhaust gas and in the distilled water leaving the condenser. It is obvious that this amount will be far in excess of the amount that can be used where indicated in the drawing, so I have indicated by a downward pointing arrow the discharge of such a surplus.

To further emphasize the importance of this step of "concentrate re-cycling" I wish to call attention to the fact that a solution of salts at near its boiling point can serve as the whole heat source for such a multiple-effect evaporator. As soon as the hot liquid enters a vacuum corresponding to a temperature below the boiling point of said hot liquid steam is evolved and said steam is then compounded in all remaining effects until the maximum vacuum is encountered. It is this "compounding" which renders a multiple-effect evaporator with many "effects" so very economic in the use of steam. Thus elucidated it will be apparent that the "steam generator" could be eliminated and the scrubber-evaporator combination would function by itself. However, if the aim and object is to obtain maximum evaporative effect from the hot exhaust gas of the turbine then this step should be retained. Such a "steam generator" as indicated is in no sense a "waste heat boiler." That would be too costly. Instead it is actually the first effect of the evaporator, hot gas instead of steam passing through the tubes. It can be serviced with distilled water, as in the drawing, or it can be on treated sea water, at will.

Returning now to the mother liquor from the "salting-out" evaporator, I have indicated same as passing to a crystallizer where it is cooled, a crop of sodium sulphate crystals obtained, and the latter separated from the new mother liquor. Salt, i.e., sodium chloride obtained from this salting-out step is then indicated as passing to electrolytic cells to produce the sodium hydroxide previously referred to and chlorine to be used later on. Inasmuch as the amount of salt obtained is far greater than required for this purpose I have indicated the separated surplus by a left-hand pointing arrow. Of course, the total amount of power produced is so large that all such salt could be converted into caustic soda and chlorine, even then leaving a surplus of power. Such items are evidently at the discretion of the operator.

This new mother liquor, from the crystallizer, is then commingled with sufficient chlorine to liberate substantially all resident bromine and the latter obtained by distillation in the conventional bromine tower. In place of said device the liberated bromine could be absorbed in activated carbon or in any other conventional manner. In any event, the liquor from the bromine separation is then further evaporated and crystallized, to yield a crop of potassium chloride and a final mother liquor which I have indicated as re-cycled to the multiple-effect scrubber, thus salvaging ultimately all contained salts. Because of such re-cycling it is unessential to obtain maximum yields anywhere after salt separation, or even there. As long as separation of one substance is carried so far that it does not contaminate subsequent steps it is entirely adequate. Trace elements from sea water will ultimately require some purging of mother liquor and such purging may even be profitable but I regard such matters as beyond the scope of this disclosure. I have abstained from any specific instructions in the chemistry involved as all such material is conventional. The composition of sea water can be found in any hand book and it is rather uniform all over the globe save when diluted with much fresh water near the mouth of rivers. The fuel used in the turbine is of no moment. Obviously, the same heat cycle involved herein could be used on other materials than sea water but I have chosen the latter as my preferred version because of its presence in the vicinity of our densest population and chemical activities as well as the enormous market for the final products.

Another advantage resides in the use of my invention to smooth-out the "peak load" factor in a generating station. It is axiomatic that more current is used during the certain definite periods such variations being both daily and seasonal. It is inevitable, therefore, that much equipment is not operating to best advantage save during the "peak" periods. Inasmuch as a gas turbine can start and stop in a matter of minutes and can be operated by remote control it has been suggested that it be used in this manner in spite of its relatively low heat conversion factor. It is obvious that to the extent that I have improved the position of said turbine as a prime mover by integrating its heat waste with a chemical industry I have made it even more acceptable as the prime mover of a central generating station.

Having thus fully described my process in such clear language that any man possessed of the requisite chemical, mechanical, and electrical knowledge can operate it without difficulty.

I claim:

1. The method of processing sea water which comprises; commingling sea water with hot exhaust gases issuing from an internal combustion prime mover to raise the temperature of said water to approximately its boiling point; commingling sufficient sodium hydroxide with said heated sea water to precipitate as magnesium hydroxide all the resident magnesium and separating said precipitate; commingling the resultant magnesium-free sea water with sufficient sodium carbonate to precipitate all resident calcium as calcium carbonate and removing said precipitate; passing the resultant magnesium-free and calcium free sea water, progressively, through a series of vessels each one of which is maintained at a higher vacuum than the preceding one thus generating steam on each passage to a higher vacuum, the steam so generated being condensed by contact with the vessel having the next higher vacuum in the series, the latent heat resident in said steam being converted into additional evaporation within said vessel, thus compounding the evaporative effect; re-cycling the liquid from the highest vacuum vessel back to the commingling step with exhaust gases from said prime mover thus regaining the temperature lost during the vacuum treatment and continuing said re-cycling until the treated sea water shall be approximately saturated as to its sodium chloride content.

2. The method of processing sea water set forth in claim 1, with the added step that a portion of the heat resident in the exhaust from the prime-mover be converted into low-pressure steam before said gases are commingled with said sea water, the steam thus generated being added to that produced during the multiple-effect evaporation after serving in the higher temperature effects.

3. The method of processing sea water set forth in claim 1, with the added step that the steam produced in the highest vacuum be condensed in a stage condensation, counter-current to the cooling sea water employed, thus decreasing the amount of such water required to maintain the requisite vacuum.

4. The method of processing sea water set forth in claim 1, with the added step that a portion of the distilled water produced, in the condensation of steam generated therein, be injected into the air required by the prime mover during its compression thus rendering said compression more nearly iso-thermal and decreasing the power demand for said compression.

5. The method of processing sea water set forth in claim 1, with the added step that the concentrated sea water obtained therein be conventionally separated into its constituent parts of sodium chloride, sodium sulphate, bromine and potassium chloride, the final mother liquor from the last step being re-cycled to the sea water circuit at any place prior to the sodium chloride separation.

6. The method of processing sea water set forth in claim 2, with the added step that sea water, freed from magnesium and calcium, be used as the watery liquid required to generate the steam specified therein.

7. The method of processing sea water set forth in claim 2, with the added step that the low-pressure steam generated therein, prior to commingling the partially cooled exhaust gases with sea water, be represented by a conversion of between 15% and 50% of the total heat resident in said gases as they leave the prime-mover, into evaporation in the form of low-pressure steam.

References Cited in the file of this patent

UNITED STATES PATENTS

| | | |
|---|---|---|
| 1,865,451 | Allyn | July 5, 1932 |
| 2,196,496 | Hamm | Apr. 9, 1940 |
| 2,404,550 | Thomsen | July 23, 1946 |
| 2,624,654 | Hirsch | Jan. 6, 1953 |
| 2,793,502 | Richl | May 28, 1957 |
| 2,863,501 | Farnsworth | Dec. 9, 1958 |
| 2,921,004 | Wood | Jan. 12, 1960 |
| 2,934,419 | Cook | Apr. 26, 1960 |
| 2,947,689 | Cain | Aug. 2, 1960 |